(12) United States Patent
Marshall et al.

(10) Patent No.: US 12,502,930 B2
(45) Date of Patent: Dec. 23, 2025

(54) DEFROST AIRFLOW ASSEMBLY FOR A HEATING, VENTILATION, AND AIR-CONDITIONING (HVAC) CASE

(71) Applicant: VALEO SYSTEMES THERMIQUES, La Verriere (FR)

(72) Inventors: Steven Marshall, Troy, MI (US); Cody Barnebee, Troy, MI (US); Timothy Mayer, Troy, MI (US); Richard Sikorski, Troy, MI (US); Abhishek Patil, Tami Nadu (IN); Jayakumar Selvan, Tami Nadu (IN); Jason Kreucher, Troy, MI (US)

(73) Assignee: Valeo Systemes Thermiques, LaVerriere (FR)

( * ) Notice: Subject to any disclaimer, the term of this patent is extended or adjusted under 35 U.S.C. 154(b) by 473 days.

(21) Appl. No.: 18/060,013

(22) Filed: Nov. 30, 2022

(65) Prior Publication Data
US 2024/0174050 A1  May 30, 2024

(51) Int. Cl.
*B60H 1/00* (2006.01)
(52) U.S. Cl.
CPC ..... *B60H 1/00842* (2013.01); *B60H 1/00678* (2013.01)
(58) Field of Classification Search
CPC ............ B60H 1/00842; B60H 1/00678; B60H 1/00685
USPC .......................................................... 454/127
See application file for complete search history.

(56) References Cited

U.S. PATENT DOCUMENTS

| | | | |
|---|---|---|---|
| 10,618,374 | B2 | 4/2020 | Rothenberg |
| 11,225,123 | B2 | 1/2022 | Spunar et al. |
| 2020/0307349 | A1 | 10/2020 | Belanger |

FOREIGN PATENT DOCUMENTS

KR        2005118970 A   * 12/2005   ......... B60H 1/00028

OTHER PUBLICATIONS

English KR2005118970 by PE2E Feb. 28, 2025.*

* cited by examiner

*Primary Examiner* — Deming Wan
(74) *Attorney, Agent, or Firm* — Valeo Systemes Thermiques

(57) ABSTRACT

A defrost airflow assembly for a heating, ventilation, and air-conditioning (HVAC) case, having a defrost channel starting in a mixing chamber and terminating in a defrost outlet with a defrost door, a demist channel starting in the mixing chamber and terminating in a demist outlet with a demist door, and a bypass channel connected directly with the pre-door defrost channel, the post-door defrost channel, the pre-door demist channel and post-door demist channel. The first bypass channel is configured to allow airflow from the mixing chamber to the defrost outlet when the defrost door is in the closed position and the demist door is in the open position.

19 Claims, 4 Drawing Sheets

DEFROST AIRFLOW ASSEMBLY FOR A HEATING, VENTILATION, AND AIR-CONDITIONING (HVAC) CASE

TECHNICAL FIELD

An object of the invention is a defrost airflow assembly for a heating, ventilation, and air-conditioning (HVAC) case and an HVAC case including said defrost airflow assembly.

BACKGROUND OF THE INVENTION

HVAC (Heating Ventilation and Air Conditioning) systems are used for climate control of, e.g., internal cabin areas of a vehicle. HVAC systems can be configured with an HVAC case having a heat exchanger disposed in a housing. An HVAC distribution system can be operatively connected to the HVAC case. HVAC system can have one or more airflow paths for allowing air to flow, for example, to, from, and/or within the HVAC case. Doors or baffles can be associated with the airflow path for controlling the amount of air flowing to, through, and/or from the HVAC case.

HVAC case can include face, defrost, demist and floor outlets, controlled by respective doors. At least some of those can be used to control the airflow towards a windshield and side windows of the vehicle. Some HVAC systems have a floor mode, in which the air is directed mainly to lower areas of the vehicle. The windshield can require defogging (demist) in the floor mode.

In some cases, there is a need to control fogging in the floor mode not only of the windshield but also of the side windows. For this purpose, some HVAC systems control position of the defrost door in order to allow a relatively small airflow through the defrost door in its otherwise almost closed position. This small airflow is also referenced to as defrost bleed.

It is usually difficult to control the defrost bleed. The door is left slightly open so that a relatively small, thin and elongated cross section for the airflow is created. It can be challenging to provide door assembly that ensures a reliable opening size, both in terms of tolerance manufacturability and control over the assembly's lifespan. Further, the defrost bleed can generate noise of high frequencies, due to its scale and geometrical shape.

It is therefore an object of the present invention to provide a defrost airflow assembly which would alleviate the above-mentioned problems.

SUMMARY OF THE INVENTION

The object of the invention is, among others, a defrost airflow assembly for a heating, ventilation, and air-conditioning (HVAC) case, comprising: a first defrost channel starting in a mixing chamber and terminating in a first defrost outlet with a first defrost door movable between an open position and a closed position so as to sealingly divide the defrost channel into a pre-door first defrost channel and a post-door first defrost channel; a first demist channel starting in the mixing chamber and terminating in a first demist outlet with a first demist door movable between an open position to a closed position so as to sealingly divide the first demist channel into a pre-door first demist channel and a post-door first demist channel; a first bypass channel connected directly with the pre-door first defrost channel, the post-door first defrost channel, the pre-door first demist channel and post-door first demist channel; wherein the first bypass channel is configured to allow airflow from the mixing chamber to the first defrost outlet when the first defrost door is in the closed position and the first demist door is in the open position.

In one embodiment, the first defrost door and the first demist door are adapted to collectively block the airflow through the defrost airflow assembly when both in their respective closed positions.

In one embodiment, the first defrost door is configured to seal the first defrost outlet with respect to the first bypass channel in the open position.

In one embodiment, the first defrost door is configured to seal the first defrost outlet with respect to the pre-door first defrost channel in the closed position.

In one embodiment, the first defrost door is configured to allow airflow between the first bypass channel and the first defrost outlet in the closed position.

In one embodiment, the first demist door is configured to seal the pre-door first demist channel with respect to the first demist outlet and the first bypass channel in the closed position.

In one embodiment, the defrost airflow assembly further comprises a first floor channel starting with a first floor inlet in the pre-door first defrost channel and terminating in a first floor outlet.

In one embodiment, the first defrost door is configured to allow airflow between the pre-door first defrost channel and the first floor channel in the closed position.

In one embodiment, the first defrost door is configured to allow airflow between the pre-door first defrost channel and the first floor channel, as well as between the first bypass channel and the post-door first defrost channel in an intermediate position between the open position and the closed position.

In one embodiment, the first defrost door is configured to block airflow from the pre-door first defrost channel and the bypass channel to the first floor channel in the open position.

In one embodiment, the first defrost door is configured to block airflow from the pre-door first defrost channel to the first floor channel, while partly allowing the airflow from the first bypass channel to the first floor channel in the open position.

In one embodiment, the first defrost door has a first defrost door rotation axis, and the first demist door has a first demist door rotation axis.

In one embodiment, the first bypass channel extends along a first bypass channel extension axis which is parallel to the first defrost door rotation axis or the first demist door rotation axis.

In one embodiment, the first bypass channel extends along a first bypass channel extension axis which is parallel to the first defrost door rotation axis and the first demist door rotation axis.

In one embodiment, the first defrost door rotation axis and the first demist door rotation axis are coaxial.

In one embodiment, the first defrost channel and the first demist channel extend in parallel defining thereby a separation section therebetween.

In one embodiment, the first bypass channel extends at least partly outside of the separation space.

In one embodiment, the first bypass channel extends exclusively outside of the separation space.

In one embodiment, the first bypass channel has a sidewall defining an elongated, cylindrical passage between the first defrost channel and the first demist channel.

Another object of the invention is a heating, ventilation, and air-conditioning (HVAC) case, comprising a housing and a defrost airflow assembly including: a first defrost channel starting in a mixing chamber and terminating in a first defrost outlet with a first defrost door movable between an open position and a closed position so as to sealingly divide the defrost channel into a pre-door first defrost channel and a post-door first defrost channel; a first demist channel starting in the mixing chamber and terminating in a first demist outlet with a first demist door movable between an open position to a closed position so as to sealingly divide the first demist channel into a pre-door first demist channel and a post-door first demist channel; a first bypass channel connected directly with the pre-door first defrost channel, the post-door first defrost channel, the pre-door first demist channel and post-door first demist channel; wherein the first bypass channel is configured to allow airflow from the mixing chamber to the first defrost outlet when the first defrost door is in the closed position and the first demist door is in the open position.

BRIEF DESCRIPTION OF DRAWINGS

The present invention will be described in greater detail below with reference to the drawings. In the drawings.

DETAILED DESCRIPTION OF THE INVENTION

Example embodiments will now be described more fully with reference to the accompanying drawings.

Figure 1:
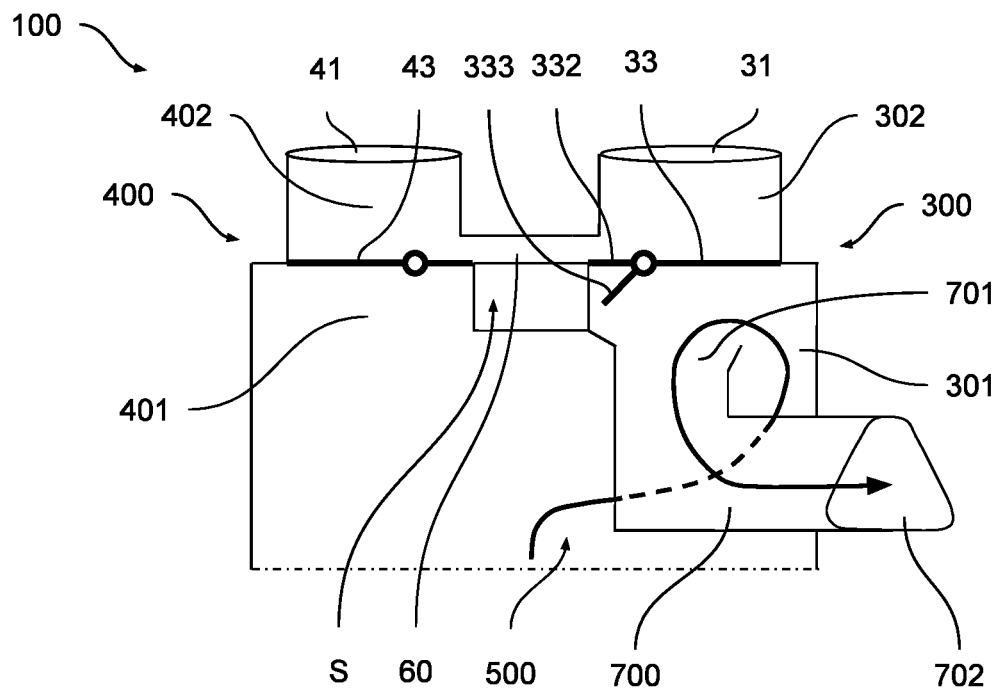
FIG. 1 shows schematically a defrost airflow assembly according to the invention in the first internal configuration.

FIG. 1 shows schematically a defrost airflow assembly 100 according to the invention in the first internal configuration. The defrost airflow assembly 100 is intended for a heating, ventilation, and air-conditioning (HVAC) system. It includes a first defrost channel 300 starting in a mixing chamber 500 and terminating in a first defrost outlet 31. The mixing chamber 500 is a volume from which pressurized air is directed downstream through the elements of the defrost airflow assembly 100. The airflow coming from the mixing chamber 500 can be cold, warm or a mix thereof. Upstream of the first defrost outlet 31 there is a first defrost door 33 movable between an open position and a closed position so as to sealingly divide the defrost channel 300 into a pre-door first defrost channel 301 and a post-door first defrost channel 302. In other words, in the closed position the first defrost door 33 prevents direct flow of air between the pre-door first defrost channel 301 and the post-door first defrost channel 302. In FIG. 1, the first defrost door 33 is in the closed position.

Within the pre-door first defrost channel 301 there is located a first floor inlet 701 of a first floor channel 700, which leads outside of the defrost assembly 100 to the first floor outlet 702. The first floor channel 700 enables supply of the air to floor area of the vehicle.

Preferably, the first defrost door 33 is configured to allow airflow between the pre-door first defrost channel 301 and the first floor channel 700 in the closed position.

The defrost airflow assembly 100 further includes a first demist channel 400 starting in the mixing chamber 500 and terminating in a first demist outlet 41. Upstream of the first demist outlet 41 there is a first demist door 43 movable between an open position to a closed position so as to sealingly divide the first demist channel 400 into a pre-door first demist channel 401 and a post-door first demist channel 402. In other words, in the closed position the first demist door 43 prevents direct flow of air between the pre-door first demist channel 401 and the post-door first demist channel 402. In FIG. 1, the first demist door 43 is in the closed position.

The first defrost door 33 and the first demist door 43 are adapted to block the airflow through the defrost airflow assembly 100 to the first defrost outlet 31 and the first demist outlet 41 when both are in their respective closed positions.

The first defrost channel 300 and the first demist channel 400 extend in parallel defining thereby a separation section S therebetween. The separation section S can be alternatively defined as the whole volume situated directly between the first defrost channel 300 and the first demist channel 400, so that every straight line connecting the first defrost channel 300 and the first demist channel 400 is contained within said volume.

The defrost airflow assembly 100 further includes a first bypass channel 60 connected directly with the pre-door first defrost channel 301, the post-door first defrost channel 302, the pre-door first demist channel 401 and post-door first demist channel 402. This means that the first bypass channel 60 can be directly exposed to them without needing any additional air channels. As can be seen, the first defrost door 33 and the first demist door 43 are the only elements that control airflow between these channels when the airflow is supplied from the mixing chamber 500.

The first bypass channel 60 is configured to allow airflow from the mixing chamber 500 to the first defrost outlet 31 when the first defrost door 33 is in the closed position and the first demist door 43 is in the open position. This can be achieved by specific arrangement of the first defrost door 33 and the first demist door 43 as explained below.

The first defrost door 33 can be configured to allow airflow between the first bypass channel 60 and the first defrost outlet 31 in the closed position.

The first demist door 43 can be configured to seal the pre-door first demist channel 401 with respect to the first demist outlet 41 and the first bypass channel 60 in the closed position.

The configurations of the first defrost door 33 and first demist door 43 can be carried out by adequately shaping them or equipping them with appropriate components, like dedicated flaps, strategically placed with respect to the first bypass channel 60, pre-door first defrost channel 301, the post-door first defrost channel 302, the pre-door first demist channel 401 and post-door first demist channel 402 so that the intended function is performed in their open and closed positions.

The first configuration of FIG. 1 can be utilized in a purge mode, in which all the air can be directed towards the floor of the vehicle.

Figure 2:
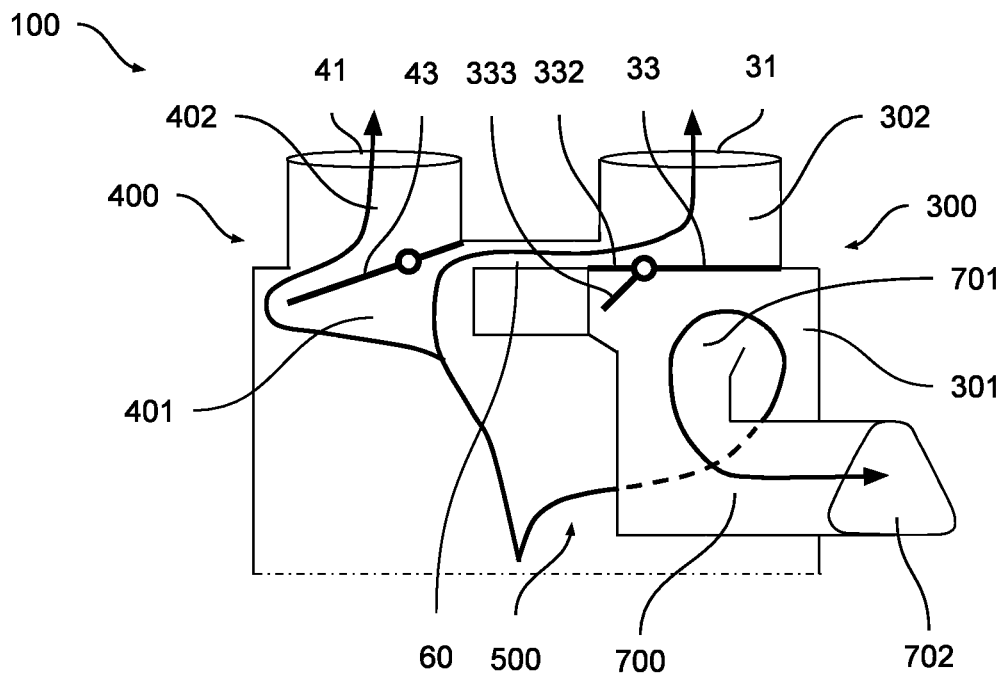
FIG. 2 shows schematically a defrost airflow assembly according to the invention in the second internal configuration.

FIG. 2 shows schematically the defrost airflow assembly 100 according to the invention in the second internal configuration. This configuration can be utilized in a floor mode with air being directed to the floor, side windows and windshield, as explained later.

The first defrost door 33 is configured to seal the first defrost outlet 31 with respect to the pre-door first defrost channel 301 in the closed position. The first demist door 43 is in the open position. By means of the first bypass channel 60, the airflow from the mixing chamber 500 to the first defrost outlet 41 is allowed exclusively through the pre-door demist channel 301, the first bypass channel 60 and the post-door first defrost channel 302.

Figure 3:
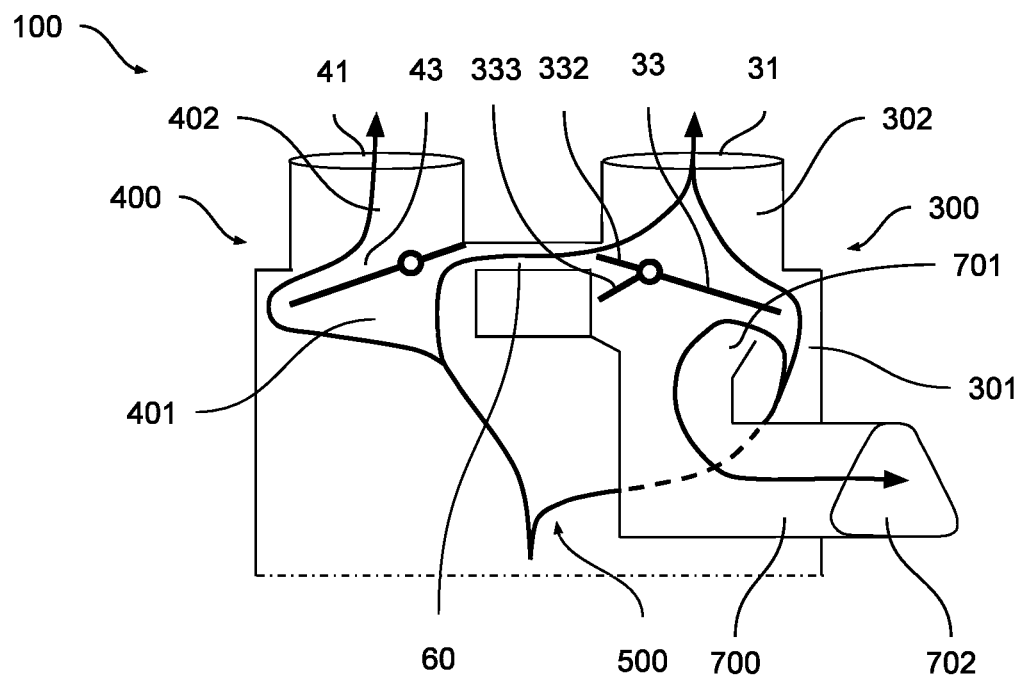
FIG. 3 shows schematically a defrost airflow assembly according to the invention in the third internal configuration.

FIG. 3 shows schematically the defrost airflow assembly 100 according to the invention in the third internal configuration. The first demist door 43 is in the open position. The first defrost door 33 is in an intermediate position, e.g. substantially half-way between the open and closed positions, enabling airflow between the mixing chamber 500 and the first defrost outlet 31, as well as enabling airflow between the first bypass channel 60 and the first defrost outlet 31.

Preferably, the first defrost door 33 is configured to allow airflow between the pre-door first defrost channel 301 and the first floor channel 700, as well as between the first bypass channel 60 and the post-door first defrost channel 302 in the intermediate position.

The third configuration of FIG. 3 can be used in a mix mode, in which airflow is enabled to all outlets 31, 41, 701.

Figure 4:
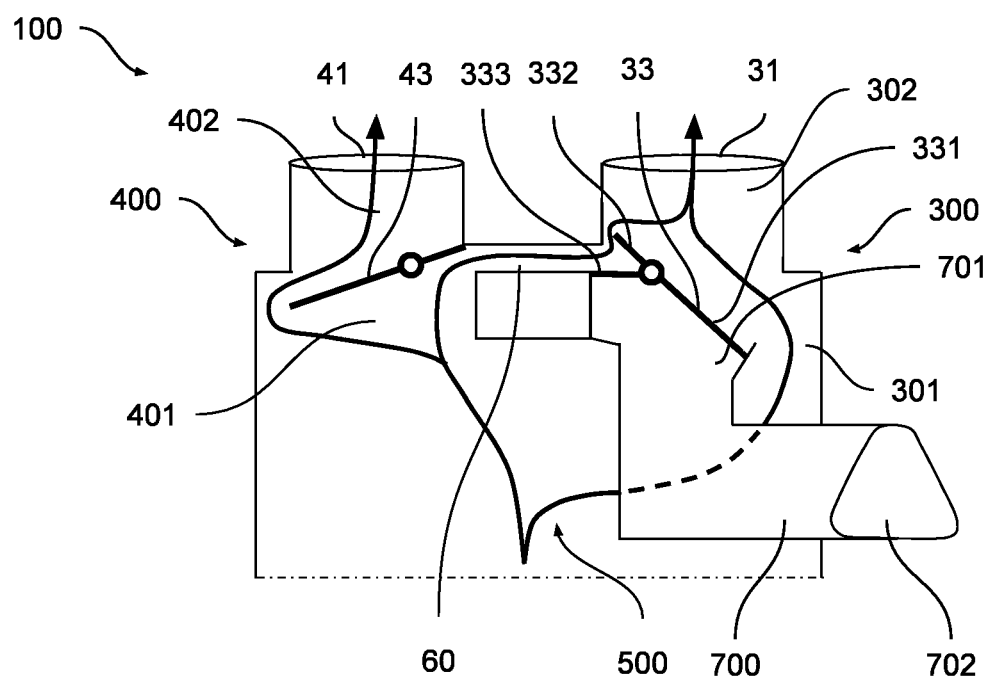
FIG. 4 shows schematically a defrost airflow assembly according to the invention in the fourth internal configuration.

FIG. 4 shows schematically the defrost airflow assembly 100 according to the invention in the fourth internal configuration. The first defrost door 33 and the first demist door 43 are in their open positions. The airflow is enabled between the pre-door first defrost channel 301 and the post-door defrost channel 302, as well as between the first bypass channel 60 and the post-door first defrost channel 302.

Preferably, the first defrost door 33 is configured to block airflow from the pre-door first defrost channel 301 and the bypass channel 60 to the first floor channel 700 in the open position.

The fourth configuration of FIG. 4 can be utilized in a defrost mode.

Figure 5:
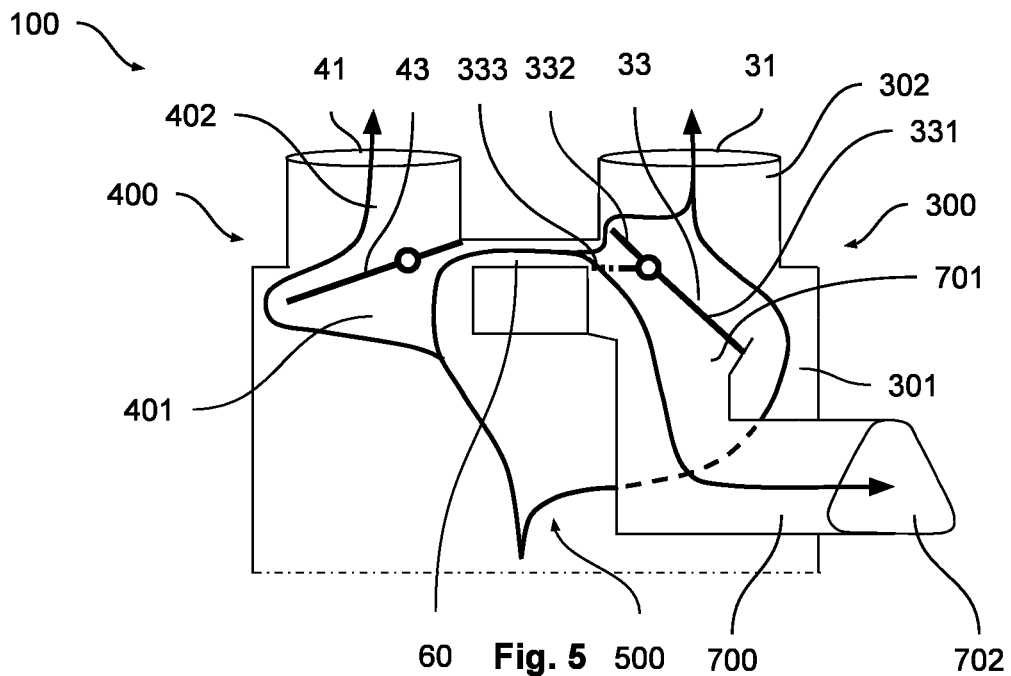
FIG. 5 shows schematically a defrost airflow assembly according to the invention in another variant of the fourth internal configuration.

FIG. 5 shows schematically the defrost airflow assembly 100 according to the invention in another variant of the fourth internal configuration. In this variant, the first defrost door 33 is configured to block airflow from the pre-door first defrost channel 301 to the first floor channel 700, while partly allowing the airflow from the first bypass channel 60 to the first floor channel 700 in the open position. The partial airflow between the first bypass channel 60 and the first floor channel 700 can be achieved by providing a partial sealing on the first defrost door 33 at relevant location. This variant can be utilized in a defrost mode while still allowing a relatively small portion of air reaching floor of the vehicle.

Figure 6:
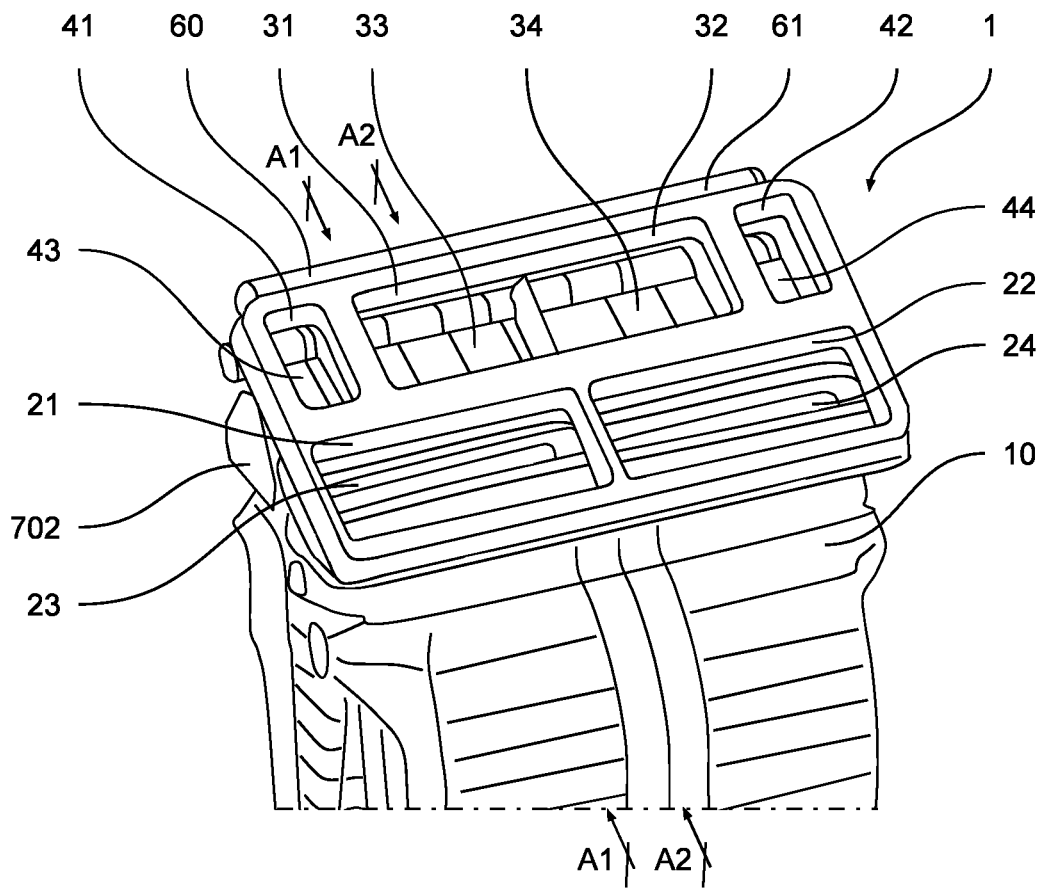
FIG. 6 shows an embodiment of a defrost airflow assembly according to the invention in an HVAC case.

FIG. 6 shows an exemplary heating, ventilation, and air conditioning (HVAC) case 1 according to the invention, in which the defrost airflow assembly 100 as explained above can implemented. The HVAC case 1 can be used in any suitable vehicle HVAC system to heat or cool airflow and direct it to various locations within the vehicle. The locations include for example windshield, side windows, upper area of passenger cabin, lower area of passenger cabin, and rear area of passenger cabin. The HVAC case 1 can be installed in any suitable vehicle, such as any suitable passenger vehicle, mass transit vehicle, recreational vehicle, construction vehicle/equipment, military vehicle/equipment, watercraft, aircraft, etc. The HVAC case 1 can also be configured for use with any suitable non-vehicular application, such as any application calling for defrost and demist airflow to a window or any other suitable surface.

The HVAC case 1 includes a housing 10. The HVAC case 1 of the present disclosure can further include a blower, a cooling unit, and a heating unit. The blower is used to pressurize the air and enable its flow throughout the HVAC case 1 and any broader HVAC system. The cooling unit is to provide cold air and the heating unit is to provide hot air. The heating unit can be a heater core or an electrical heating device. The cooling unit can be an evaporator or an electrical cooling device. These components are typical components for an HVAC case and operate similarly to the components in a conventional HVAC system. Thus, the operation of the blower, cooling unit, and heating unit will not be explained in further detail. Further, unless specifically stated, any reference to "volume of air" or "airflow" in the specification does not specifically refer to cold air, hot air or mixed air but rather is just a generic term used for simplicity.

The housing 10 includes a plurality of outlets through which airflow exits the HVAC case 1. Specifically, the housing 10 defines a first face outlet 21 and a second face outlet 22. The first and second face outlets 21, 22 direct airflow to an upper portion of the vehicle passenger cabin, such as towards the faces of occupants of the passenger cabin. Airflow exiting the first and second face outlets 21, 22 can flow directly to the passenger cabin or through any suitable tubes or other conduits leading to the passenger cabin. The airflow exiting the first and second face outlets 21, 22 is respectively at least partly controlled by a first face door 23 and a second face door 24.

The housing 10 further defines the first defrost outlet 31 and the first demist outlet 41. The first demist outlet 41 is adjacent to the first defrost outlet 31. The housing 10 can further define a second defrost outlet 32 and a second demist outlet 42, which is adjacent to the second defrost outlet 42.

The first defrost outlet 31 and the second defrost outlet 32 direct heated airflow to a windshield of the vehicle in order to defrost the windshield. The first demist outlet 41 and the second demist outlet 42 direct heated airflow to side windows of the vehicle to demist the side windows. The first and second defrost outlets 31, 32 and the first and second demist outlets 41, 42 can alternatively be configured to direct heated airflow to any other suitable surface and/or area as well.

The airflow through the first defrost outlet 31 is controlled by the first defrost door 33, while the airflow through the second defrost door 32 is controlled by a second defrost door 34.

The airflow through the first demist outlet 41 is controlled by the first demist door 43, while the airflow through the second demist outlet 42 is controlled by a second demist door 44.

The second defrost outlet 32 and the second demist outlet 42 are generally configured as mirror images of the first defrost outlet 31 and the first demist outlet 41, respectively. Thus, the description herein of the first defrost outlet 31 also applies to the second defrost outlet 32, and the description of the first demist outlet 41 also applies to the second demist outlet 42. The same applies to the first bypass channel 60 and a second bypass channel 61 (not shown in detail), associated analogously with the second defrost outlet 32 and the second demist outlet 42, as well as the first floor channel 700, first floor inlet 701 and first floor outlet 701 and their respective second floor channel, second floor inlet and second floor outlet (not shown).

The housing 10 can also define a first foot outlet and a second foot outlet (not shown). The first and second foot outlets direct airflow to a lower portion of the passenger cabin, such as towards the feet of occupants of the passenger cabin. The first and second foot outlets are connected to any suitable airflow conduits, such as hoses, which direct the airflow to the passenger cabin. The housing 10 can further define a rear outlet through which airflow passes to a rear of the vehicle (not shown).

Figure 7:
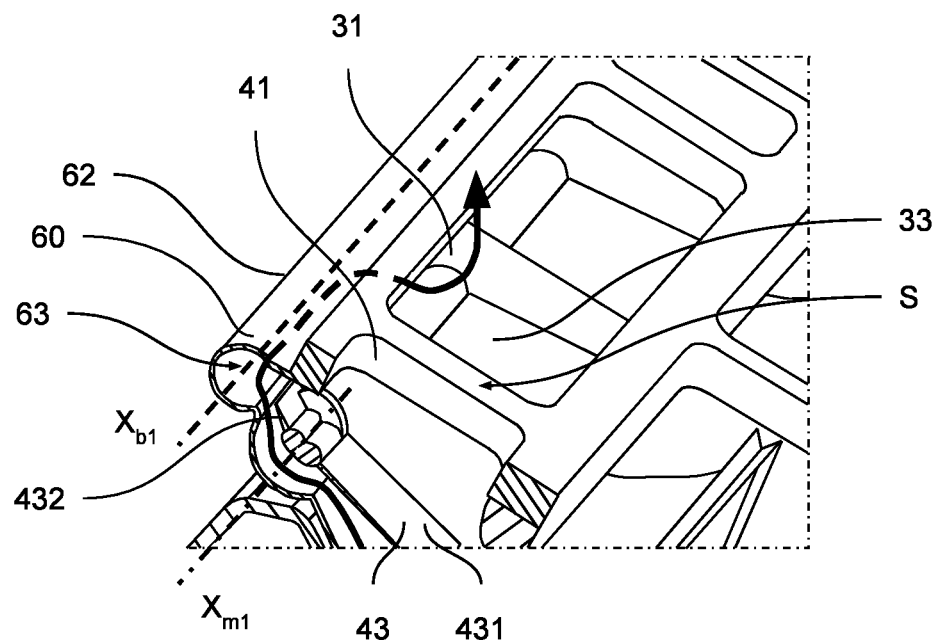
FIG. 7 shows a first partial cross-sectional view of the HVAC case of FIG. 6.
Figure 8:
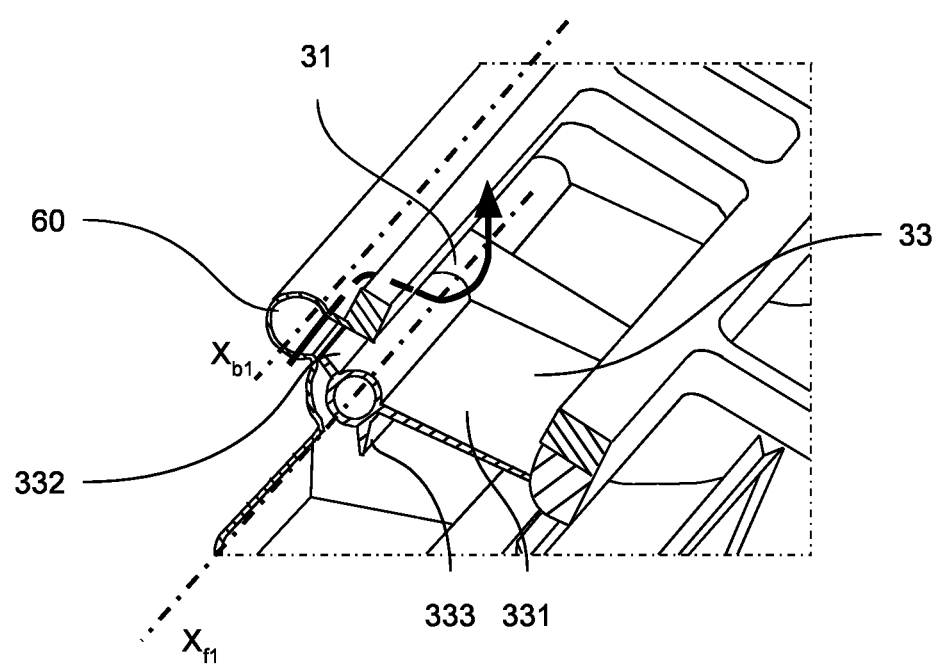
FIG. 8 shows a second partial cross-sectional view of the HVAC case of FIG. 6.

FIG. 7 shows a first partial cross-sectional view A1 of the HVAC case of FIG. 6, while FIG. 8 shows a second partial cross-sectional view A2 of the HVAC case of FIG. 6. The arrows indicate the bypassing airflow paths.

The first bypass channel 60 can have a sidewall 62 defining an elongated, cylindrical passage 63 between the first defrost channel 300 and the first demist channel 400. The first bypass channel 60 can extend along a first bypass channel extension axis Xb1.

As shown, the elongated cylindrical passage 63 enables connecting the first bypass channel 60 directly to the pre-door first defrost channel 301, the post-door first defrost channel 302, the pre-door first demist channel 401 and post-door first demist channel 402 by simply extending adjacent to the first defrost channel 300 and the first demist channel 400 and opening the sidewall 62 at the connecting portions.

The first defrost door 33 can have a first defrost door rotation axis Xf1 around which it moves between the open and closed position. The first demist door 43 can have a first demist door rotation axis Xm1 around which it moves between the open and closed position.

The first demist door 43 can have a primary first demist flap 431 and a secondary first demist flap 432, which in the closed position allow to sealingly separate the pre-door first demist channel 401 with respect to the first bypass channel 60 and the post-door first demist channel 402, while allowing airflow in therebetween in the open position.

The first defrost door 33 can have a primary first defrost flap 331, a secondary first defrost flap 332 and a tertiary first defrost flap 333, which in the closed position allow to sealingly separate the pre-door first defrost channel 301 with respect to the first bypass channel 60 and the post-door first defrost channel 302. Conversely, in the open position the airflow between the pre-door first defrost channel 301 and the post-door first defrost channel 302 is enabled. Preferably, the tertiary first defrost flap 333 together with the primary first defrost flap 331 close the first floor inlet 702 in the open position of the first defrost door 33 as shown in FIGS. 4 and 5. As explained in relation to FIG. 5, the tertiary first defrost flap 333 may have a sealing adapted to allow some airflow between the first bypass channel 60 and the first floor inlet 701.

The first bypass channel extension axis Xb1 can be parallel to the first defrost door rotation axis Xf1 or the first demist door rotation axis Xm1. In the shown embodiment, the first bypass channel 60 extends along a first bypass channel extension axis Xb1 which is parallel to the first defrost door rotation axis Xf1 and the first demist door rotation axis Xm1 at the same time.

Preferably, the first defrost door rotation axis Xf1 and the first demist door rotation axis Xm1 are coaxial.

The first bypass channel 60 can extend at least partly outside of the separation space S. Preferably, the first bypass channel 60 extends exclusively outside of the separation space S. This allows utilizing space available on the outer periphery of the housing 10.

The present invention allows to replace the long thin area of the long very narrow cross section of the defrost bleed known in the art with a defined shape, of similar or smaller area. The first and second bypasses 60, 61 allow shape change that increases the relative size of the turbulent eddies. The scale of the turbulence is larger, leading to lower frequency as opposed to a discernable or "sharp" noise. The invention creates essentially a fixed or metered opening for the flow to be controlled, rather than having to rely on actuator or kinematic chain accuracy, and resulting instability due to design production tolerances. The hysteresis issue is removed by fully closing the first defrost and/or second defrost door 31, 32.

Other variations to the disclosed embodiments can be understood and effected by those skilled in the art in practicing the claimed invention, from a study of drawings, the disclosure, and the appended claims. The mere fact that certain measures are recited in mutually different dependent claims does not indicate that a combination of these measures cannot be used to the advantage.

What is claimed is:

1. A defrost airflow assembly for a heating, ventilation, and air-conditioning (HVAC) case, comprising:
    a first defrost channel starting in a mixing chamber and terminating in a first defrost outlet with a first defrost door movable between an open position and a closed position so as to sealingly divide the first defrost channel into a pre-door first defrost channel and a post-door first defrost channel;
    a first demist channel starting in the mixing chamber and terminating in a first demist outlet with a first demist door movable between an open position to a closed position so as to sealingly divide the first demist channel into a pre-door first demist channel and a post-door first demist channel;
    a first bypass channel connected directly with the pre-door first defrost channel, the post-door first defrost channel, the pre-door first demist channel and post-door first demist channel;
    wherein the first bypass channel is configured to allow airflow from the mixing chamber to the first defrost outlet when the first defrost door is in the closed position and the first demist door is in the open position, and
    a first floor channel starting with a first floor inlet in the pre-door first defrost channel and terminating in a first floor outlet; wherein the first floor channel enables supply of air to a floor area of a vehicle.

2. The defrost airflow assembly according to claim 1, wherein the first defrost door and the first demist door are adapted to collectively block the airflow through the defrost airflow assembly when both in their respective closed positions.

3. The defrost airflow assembly according to claim 1, wherein the first defrost door is configured to seal the first defrost outlet with respect to the first bypass channel in the open position.

4. The defrost airflow assembly according to claim 1, wherein the first defrost door is configured to seal the first defrost outlet with respect to the pre-door first defrost channel in the closed position.

5. The defrost airflow assembly according to claim 1, wherein the first defrost door is configured to allow airflow between the first bypass channel and the first defrost outlet in the closed position.

6. The defrost airflow assembly according to claim 1, wherein the first demist door is configured to seal the pre-door first demist channel with respect to the first demist outlet and the first bypass channel in the closed position.

7. The defrost airflow assembly according to claim 1, wherein the first defrost door is configured to allow airflow between the pre-door first defrost channel and the first floor channel in the closed position.

8. The defrost airflow assembly according to claim 1, wherein the first defrost door is configured to allow airflow between the pre-door first defrost channel and the first floor channel, as well as between the first bypass channel and the post-door first defrost channel in an intermediate position between the open position and the closed position.

9. The defrost airflow assembly according to claim 1, wherein the first defrost door is configured to block airflow from the pre-door first defrost channel and the bypass channel to the first floor channel in the open position.

10. The defrost airflow assembly according to claim 1, wherein the first defrost door is configured to block airflow from the pre-door first defrost channel to the first floor channel, while partly allowing the airflow from the first bypass channel to the first floor channel in the open position.

11. The defrost airflow assembly according to claim 1, wherein the first defrost door has a first defrost door rotation axis, and the first demist door has a first demist door rotation axis.

12. The defrost airflow assembly according to claim 11, wherein the first bypass channel extends along a first bypass channel extension axis which is parallel to the first defrost door rotation axis or the first demist door rotation axis.

13. The defrost airflow assembly according to claim 11, wherein the first bypass channel extends along a first bypass channel extension axis which is parallel to the first defrost door rotation axis and the first demist door rotation axis.

14. The defrost airflow assembly according to claim 11, wherein the first defrost door rotation axis and the first demist door rotation axis are coaxial.

15. The defrost airflow assembly according to claim 14, wherein the first bypass channel extends at least partly outside of the separation space.

16. The defrost airflow assembly according to claim 14, wherein the first bypass channel extends exclusively outside of the separation space.

17. The defrost airflow assembly according to claim 1, wherein the first defrost channel and the first demist channel extend in parallel defining thereby a separation section therebetween.

18. The defrost airflow assembly according to claim 1, wherein the first bypass channel has a sidewall defining an elongated, cylindrical passage between the first defrost channel and the first demist channel.

19. A heating, ventilation, and air-conditioning (HVAC) case, comprising
a housing and
a defrost airflow assembly including:
    a first defrost channel starting in a mixing chamber and terminating in a first defrost outlet with a first defrost door movable between an open position and a closed position so as to sealingly divide the first defrost channel into a pre-door first defrost channel and a post-door first defrost channel;
    a first demist channel starting in the mixing chamber and terminating in a first demist outlet with a first demist door movable between an open position to a closed position so as to sealingly divide the first demist channel into a pre-door first demist channel and a post-door first demist channel;
    a first bypass channel connected directly with the pre-door first defrost channel, the post-door first defrost channel, the pre-door first demist channel and post-door first demist channel;
    wherein the first bypass channel is configured to allow airflow from the mixing chamber to the first defrost outlet when the first defrost door is in the closed position and the first demist door is in the open position; and
a first floor channel starting with a first floor inlet in the pre-door first defrost channel and terminating in a first floor outlet; wherein the first floor channel enables supply of air to a floor area of a vehicle.

\* \* \* \* \*